United States Patent [19]

Fechter

[11] Patent Number: 5,326,322

[45] Date of Patent: Jul. 5, 1994

[54] CONE STYLE UNIVERSAL JOINT

[75] Inventor: Mark A. Fechter, West Bend, Wis.

[73] Assignee: Weasler Engineering, Inc., West Bend, Wis.

[21] Appl. No.: 805,338

[22] Filed: Dec. 9, 1991

[51] Int. Cl.5 ............................................. F16D 3/16
[52] U.S. Cl. ..................................... 464/11; 464/136
[58] Field of Search ........ 464/11, 122, 123, 131–133, 464/136; 277/96.1, 152, 212 F

[56] References Cited

U.S. PATENT DOCUMENTS

| 698,159 | 4/1902 | Vanderbeek | 464/11 |
|---|---|---|---|
| 1,826,611 | 10/1931 | Furguson | 464/132 X |
| 2,873,591 | 2/1959 | Stillwagon, Jr. | 464/11 |
| 2,876,636 | 3/1959 | Thackeray | 464/136 X |
| 4,147,041 | 4/1979 | Girguis et al. | 464/11 |
| 4,317,341 | 3/1982 | Krude | 464/131 X |
| 4,385,673 | 5/1983 | Olt, Jr. | 180/9.5 |
| 4,440,401 | 4/1984 | Olschowski et al. | 464/131 X |
| 4,826,342 | 5/1989 | Fujita | 403/57 |

FOREIGN PATENT DOCUMENTS 2107824 5/1983 United Kingdom .

OTHER PUBLICATIONS

Commercial information of Mitrpak Division, Johnson & Bassette, Inc., Worcester, Mass.

Primary Examiner—Daniel P. Stodola
Attorney, Agent, or Firm—Quarles & Brady

[57] ABSTRACT

A cone style universal joint has two yokes defining two pivot axes perpendicular to one another. Four pins, each coaxial with its corresponding pivot axis, are fixed to the arms of the yokes and are journaled in associated cone bearings radially inside of the arms. The cone bearings are snap fit into four sides of a seal block to form a lubricant-tight seal between the bearing and the seal block. Each cone bearing has a 45° frusto-conical surface which engages the frusto-conical surfaces of the two adjacent cone bearings in line contact. Each cone bearing also has a recessed spherical surface facing inwardly and the four bearings together capture a ball within their recessed surfaces, inside the seal block.

5 Claims, 2 Drawing Sheets

CONE STYLE UNIVERSAL JOINT

FIELD OF THE INVENTION

This invention relates to universal joints for transmitting torque between two rotary shafts at an angle, and particularly to a cone style universal joint.

BACKGROUND OF THE INVENTION

Universal joints for coupling rotary shafts at an angle and transmitting torque therebetween are well known and of many different varieties. One such variety is known as a cone style universal joint. An example of such a universal joint is described in U.K. patent application GB 2,107,824 A.

A typical cone style universal joint has two identical yokes and a cone bearing is pinned on the inside surface of each arm of the yokes. Each cone bearing has a conical surface which bears against the conical surfaces of two adjacent cone bearings. Each cone bearing also has a spherical surface at its inside end which is in sliding contact with a ball. Thereby, as torque is transmitted from one yoke to the other, the point of intersection of the shaft axes of rotation remains at the center of the ball.

One problem with universal joints and specifically with cone style universal joints is lubrication. During rotation, parts of the universal joint slide relative to one another, which can result in excessive wear without proper lubrication. Aggravating the problem is that as the joint is rotated, significant centrifugal forces are generated which tend to evacuate all lubricant from the joint.

SUMMARY OF THE INVENTION

The invention provides a cone style universal joint having a sealing block to overcome the above disadvantages. The sealing block fits into the space circumscribed by the arms of the yokes. The seal block defines a sealed space within it, with the ball of the joint being received in the sealed space and the bearings being received within apertures in walls of the seal block. The seal block forms a reservoir for lubricant so that the joint need not be lubricated over a normal useful life.

In one aspect, a lubricant-tight seal is formed between each bearing and the seal block. In this aspect, it is preferred to make the seal block of plastic material, and to assemble the bearings to the seal block with a snap fit, so as to impede the flow of lubricant between the bearings and the seal block and to ease assembly. In an especially useful form, each aperture includes a flange and an inwardly extending bore, so that the flange and bore create a labyrinth seal with the bearing received within the aperture. Preferably, the flange overlaps an outer annular surface of the bearing, so that as the bearing is urged radially outwardly, which it is when the joint is operated, the outer annular surface seals against the flange.

In another aspect, each arm of the yokes includes a pin which extends from the arm into a bore in the bearing. The bearing is preferably rotatable relative to the pin and the pin is fixed to the arm. In an especially preferred form, each arm overlies its associated bearing at an outer edge of the bearing bore so as to impede the flow of lubricant therefrom.

DETAILED DESCRIPTION OF THE PREFERRED EMBODIMENT

Figure 1:
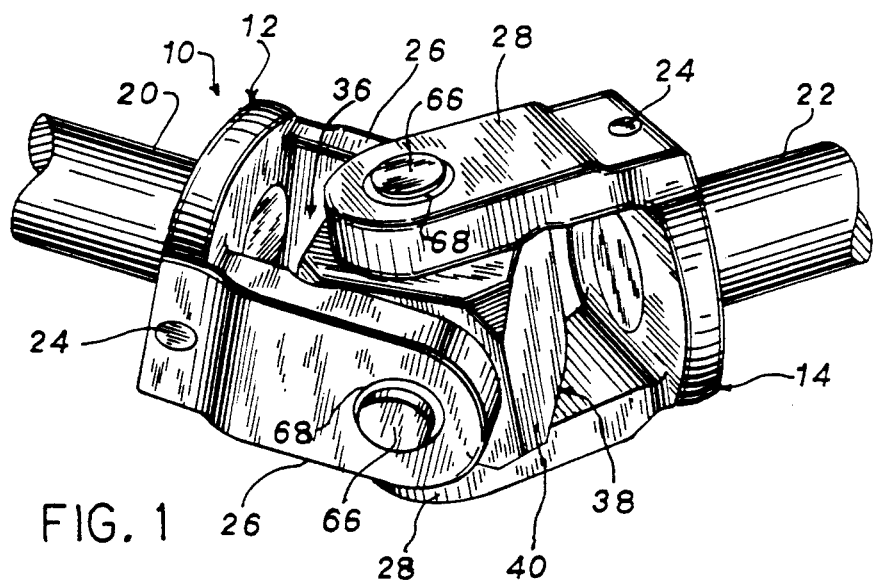
FIG. 1 is a perspective view of a cone style universal joint of the present invention shown oriented at an angle.
Figure 2:
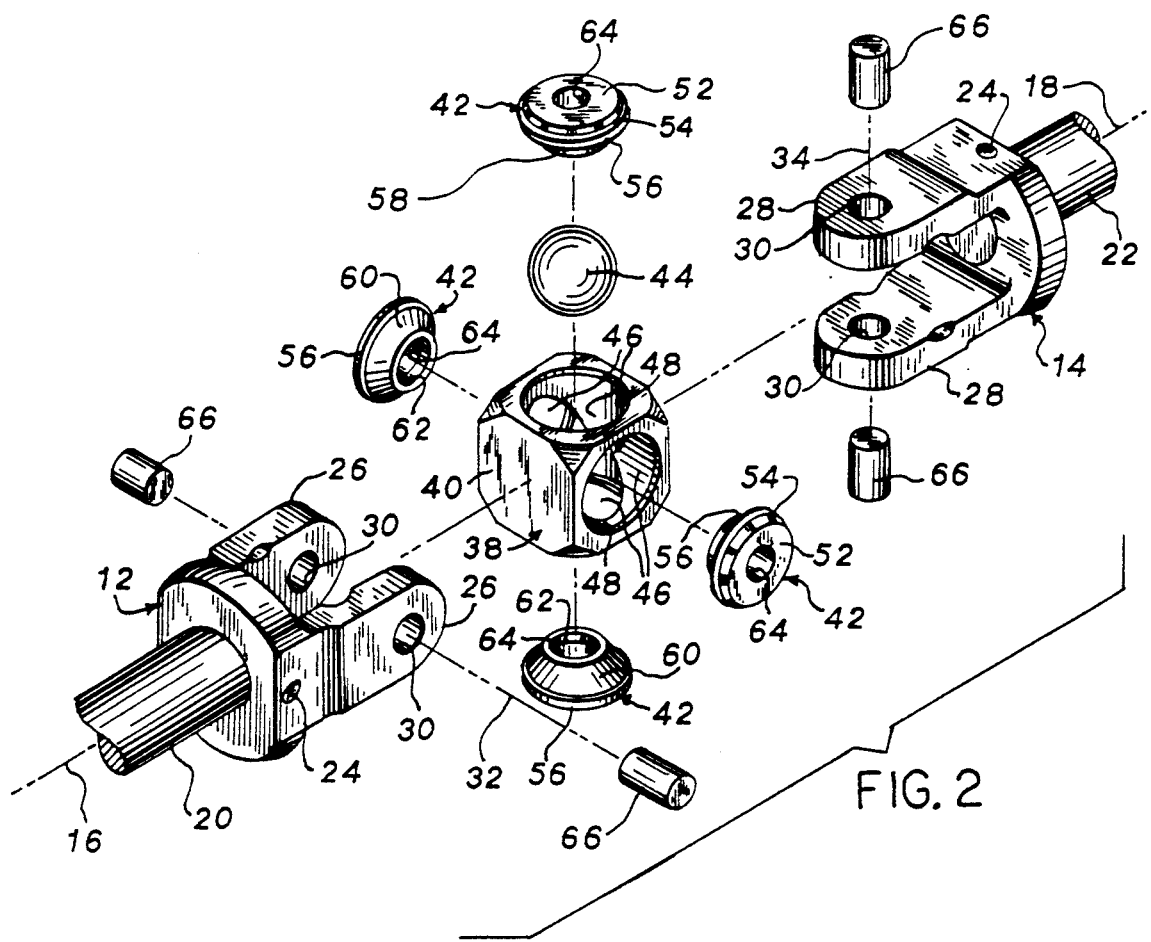
FIG. 2 is an exploded perspective view of the joint of FIG. 1.
Figure 3:
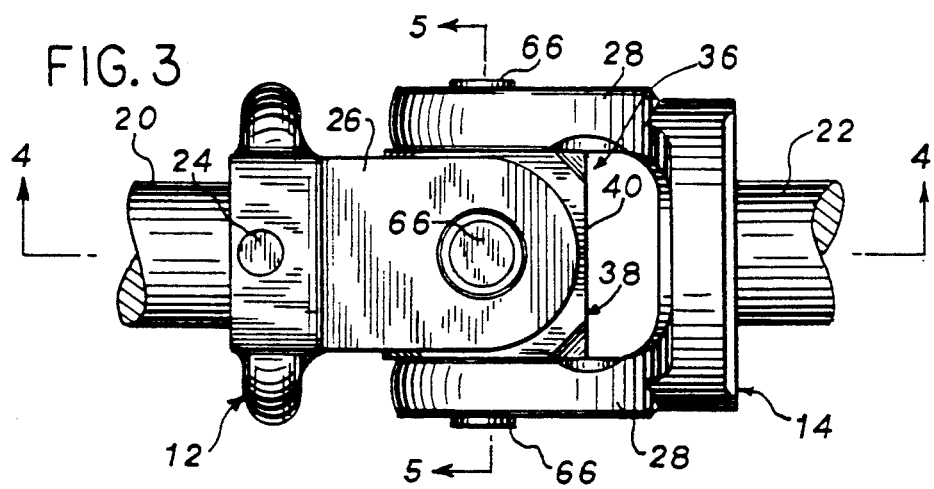
FIG. 3 is a side plan view of the joint of FIG. 1, shown in an aligned orientation.
Figure 4:
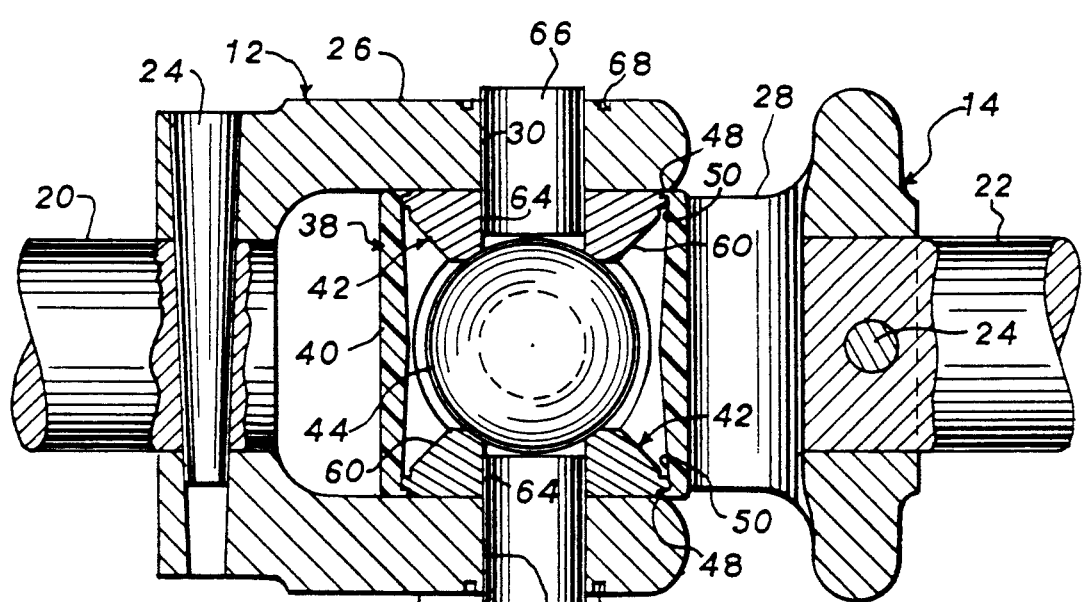
FIG. 4 is a cross sectional view taken along the plane of the line 4—4 of FIG. 3.

FIG. 1 illustrates a cone style universal joint 10 of the present invention. The joint 10 has a first yoke 12 and a second yoke 14 which define respective first and second shaft rotary axes 16 and 18. First shaft 20 and second shaft 22 are fixed to respective yokes 12 and 14 by pins 24 or any other suitable means. The universal joint 10 is used to couple the first shaft 20 and the second shaft 22 at an angle so as to transmit torque from one of the shafts 20 and 22 to the other. This type of universal joint finds application in drive lines, steering linkages, and in any application where torque must be transmitted from one shaft to another around an angle.

The first yoke 12 has a pair of opposed, spaced apart arms 26 and the second yoke 14 has a pair of opposed, spaced apart arms 28. Each of the arms 26 and 28 has a through-bore 30. The through-bores 30 of the arms 26 define a first pivot axis 32 and the through-bores 30 of the arms 28 define a second pivot axis 34. The pivot axes 32 and 34 lie in a common plane and intersect one another at the center of the joint 10, at the point where the shaft axes 16 and 18 intersect one another when the shafts 20 and 22 are at an angle relative to one another.

The arms 26 and 28 of the yokes 12 and 14 are substantially centered and oriented perpendicularly relative to one another so as to circumscribe a generally hexahedron shaped interior space 36. A centering subassembly 38 resides within the interior space. The centering subassembly 38 forms an element of the connection between the first and second yokes 12 and 14 which assures that the first and second pivot axes 32 and 34 remain in a common plane and intersect one another at the center of the joint 10, where the shaft axes 16 and 18 intersect one another.

Figure 6:
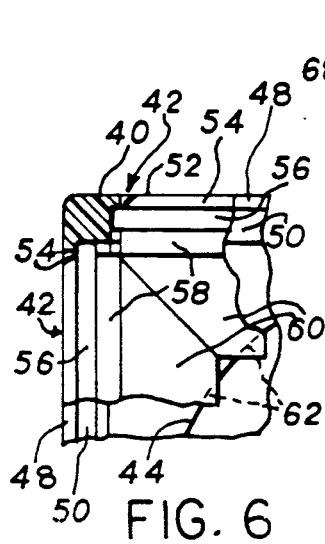
FIG. 6 is a detail view of a portion of FIG. 5.

The centering subassembly 38 includes a seal block 40, four cone bearings 42 and a ball 44. The seal block 40 is preferably made of a plastic material such as high density polyethylene and is generally in the shape of a hexahedron, somewhat smaller than the interior space 36. The corners of the seal block 40 are relieved so as to eliminate any sharp points and provide swing clearance in yoke space 36. The four sides of the seal block 40 which are intersected by the plane defined by the pivot axes 32 and 34 each have a circular aperture 46 within which an associated one of the cone bearings 42 is received. Referring particularly to FIG. 6, each aperture 46 is defined by a flange 48 and a bore 50 which extends inwardly from the flange 48. The flange 48 is joined to the bore 50 in a radius so as to relieve stress concentrations.

Each cone bearing 42 has an outer face 52, an outwardly facing annular surface 54, a cylindrical surface 56 which is coterminous at its outer end with the surface 54, a joining cylindrical surface 58, an inwardly directed frusto-conical surface 60 and an inwardly facing recess defined by a spherical surface 62. Each bearing 42 also has an axial bore 64 extending therethrough. The cone bearings 42 are coaxial with their corresponding pivot axes 32 or 34 and the angle of the frusto-conical surface 60 is at 45° relative to the corresponding pivot axes 32 or 34. Each cone bearing 42 is received within its corresponding aperture 46 in a snap fit, with the flange 48 of the aperture 46 overlapping the annular surface 54 of the bearing 42 and the cylindrical surface 56 being received in the bore 50 in a light interference fit. The cone bearings 42 are preferably made of a relatively hard and lubricious material, such as oil impregnated sintered carbon steel.

Figure 5:
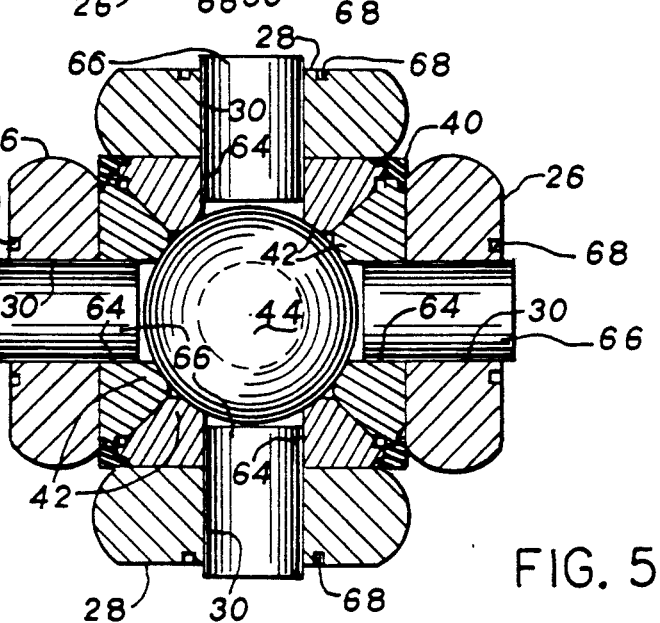
FIG. 5 is a cross sectional view taken along the plane of the line 5—5 of FIG. 3

Referring particularly to FIG. 5, when all four bearings 42 are assembled in the seal block 40, each bearing 42 is in line contact with each of the two adjacent cone bearings 42 where the frusto-conical surfaces 60 of the adjacent bearings meet. The ball 44 is received and captured within the recesses defined by the surfaces 62 in a close sliding fit. Thereby, the ball 44 maintains all four bearings 42 centered relative to one another so that the pivot axes 32 and 34 intersect at the common central point of the joint 10. The material of the ball is preferably a chrome alloy steel such as AISI E-52100. With the ball 44 captured between the bearings 42, the annular surfaces 54 are radially inward of the flanges 48 and the flanges 48 preferably bear on the surfaces 54 when the frusto-conical surfaces 60 are in contact.

The centering subassembly 38 is packed with grease or other suitable lubricant when the ball 44 and bearings 42 are assembled to the seal block 40. Then, the bores 64 of the bearings 42 are aligned with the bores 30 of the arms 26 and 28. Pins 66 are inserted to extend through the bores 30 and into the bores 64, so as to secure the yokes 12 and 14 together. The pins 66 are preferably received in a medium or heavy press fit in the bores 30 and in a close sliding fit in the bores 64. The material on the outer face of each arm 26 and 28 which surrounds the bore 30 is then swaged at 68 with an appropriate tool so as to lock the pins 66 in the bores 30. Expanding the material of the arm around the bore 30 at 68 to secure the pin 66 rather than expanding the pin itself is preferred so as not to deform the ball 44 or expand or move arms 26 and 28 outward which would increase clearance between the arms 26 and 28 and the centering subassembly 38 and therefore increase backlash, which may occur if the pin were given a sharp blow. Preferably, the centering subassembly 38 is received between the arms 26 and 28 in a light press fit so that the inner surfaces of the arms 26 and 28 bear lightly on the outer faces 52 of the bearings 42. As such, any flow of lubricant between the bores 64 and the pins 66 which may otherwise occur is impeded.

In operation, the majority of sliding motion in the joint 10 occurs between the pins 66 and the bores 64, although some sliding or rolling on one another may also occur between the bearings 42. Torque is transmitted by the frusto-conical surfaces 60 bearing upon one another and the yokes 12 and 14 are maintained centered relative to one another by the ball 44. Since the seal block 40 provides a reservoir of lubricant which is substantially lubricant-tight, excellent lubrication is provided for what would normally be expected to be the entire useful life of the joint.

A preferred embodiment of the invention has been described in considerable detail. Modifications and variations of the invention will be apparent to those of ordinary skill in the art, but which will embody the spirit and scope of the invention. Therefore, the invention should not be limited by the scope of the foregoing description, but only by the claims which follow.

I claim:

1. A cone style universal joint, comprising:

a first yoke defining a first shaft axis and having a pair of opposed, spaced apart arms, said arms defining a first pivot axis which is substantially perpendicular to said first shaft axis;

a second yoke defining a second shaft axis and having a pair of opposed, spaced apart arms, said arms defining a second pivot axis which is perpendicular to said second shaft axis and is perpendicular to and intersects said first pivot axis;

wherein the arms of said yokes circumscribe an interior space;

four cone bearings, one associated with each arm, in said interior space, each said bearing coaxial with the pivot axis defined by said associated arm and having an inwardly directed frusto-conical surface which bears on the frusto-conical surfaces of the two adjacent bearings and an inwardly facing recessed surface;

a ball captured within the recessed surfaces of the bearings;

means for securing each bearing to its associated arm; and a seal block within the interior space and defining a sealed space within it, said ball being received in said sealed space and said bearings being received within apertures in walls of said seal block;

wherein the means for securing each of the bearings to its associated arm includes a pin extending from said arm into a bore in said bearing, said pin being received in said bore in a close sliding fit so that said pin can rotate relative to said bearing, each pin is secured in a bore in the associated arm by a swage around the bore on an exterior surface of said arm, the seal block is made of plastic material and said bearings are received within said apertures in a snap fit.

2. A cone style universal joint, comprising:

a first yoke defining a first shaft axis and having a pair of opposed, spaced apart arms, said arms defining a first pivot axis which is substantially perpendicular to said first shaft axis;

a second yoke defining a second shaft axis and having a pair of opposed, spaced apart arms, said arms defining a second pivot axis which is perpendicular to said second shaft axis and is perpendicular to and intersects said first pivot axis;

wherein the arms of said yokes circumscribe an interior space;

four cone bearings, one associated with each arm, in said interior space, each said bearing coaxial with the pivot axis defined by said associated arm and having an inwardly directed frusto-conical surface which bears on the frusto-conical surfaces of the two adjacent bearings and an inwardly facing recessed surface;

a ball captured within the recessed surfaces of the bearings;

means for securing each bearing to its associated arm; and a seal block within the interior space and defining a sealed space within it, said ball being received in said sealed space and said bearings being received within apertures in walls of said seal block;

wherein the means for securing each of the bearings to its associated arm includes a pin extending from said arm into a bore in said bearing, said pin being received in said bore in a close sliding fit so that said pin can rotate relative to said bearing, each pin is secured in a bore in the associated arm by a swage around the bore on an exterior surface of said arm and each said aperture includes a flange and an inwardly extending bore, said flange and bore creating a labyrinth seal with the bearing received within said aperture.

3. A cone style universal joint as in claim 2, wherein said flange overlaps an outer annular surface of said bearing.

4. A cone style universal joint, comprising:

a first yoke defining a first shaft axis and having a pair of opposed, spaced apart arms, said arms defining a first pivot axis which is substantially perpendicular to said first shaft axis;

a second yoke defining a second shaft axis and having a pair of opposed, spaced apart arms, said arms defining a second pivot axis which is perpendicular to said second shaft axis and is perpendicular to an intersects said first pivot axis;

wherein the arms of said yokes circumscribe an interior space;

four cone bearings, one associated with each arm, in said interior space, each said bearing coaxial with the pivot axis defined by said associated arm and having an inwardly directed frusto-conical surface which bears on the frusto-conical surfaces of the two adjacent bearings and an inwardly facing recessed surface;

a ball captured within the recessed surfaces of the bearings;

means for securing each bearing to its associated arm; and a seal block within the interior space and defining a sealed space within it, said ball being received in said sealed space and said bearings being received within apertures in walls of said seal block;

wherein the means for securing each of the bearings to its associated arm includes a pin extending from said arm into a bore in said bearing, said pin being received in said bore in a close sliding fit so that said pin can rotate relative to said bearing, each pin is secured in a bore in the associated arm by a swage around the bore on an exterior surface of said arm and each arm overlaps a joint formed between the associated aperture in the seal block and the exterior surface of the bearing.

5. A cone style universal joint, comprising:

a first yoke defining a first shaft axis and having a pair of opposed, spaced apart arms, said arms defining a first pivot axis which is substantially perpendicular to said first shaft axis;

a second yoke defining a second shaft axis and having a pair of opposed, spaced apart arms, said arms defining a second pivot axis which is perpendicular to said second shaft axis and is perpendicular to and intersects said first pivot axis;

wherein the arms of said yokes circumscribe an interior space;

four cone bearings, one associated with each arm, in said interior space, each said bearing coaxial with the pivot axis defined by said associated arm and having an inwardly directed frusto-conical surface which bears on the frusto-conical surfaces of the two adjacent bearings and an inwardly facing recessed surface;

a ball captured within the recessed surfaces of the bearings;

means for securing each bearing to its associated arm; and a seal block within the interior space and defining a sealed space within it, said ball being received in said sealed space and said bearings being received within apertures in walls of said seal block;

wherein the means for securing each of the bearings to its associated arm includes a pin extending from said arm into a bore in said bearing, said pin being received in said bore in a close sliding fit so that said pin can rotate relative to said bearing, each pin is secured in a bore in the associated arm by a swage around the bore on an exterior surface of said arm and the bearings, the ball and the seal block define an integral subassembly, said subassembly being received between the arms in a press fit.

* * * * *